(12) United States Patent
Yoshimoto et al.

(10) Patent No.: US 11,807,921 B2
(45) Date of Patent: Nov. 7, 2023

(54) METAL POWDER

(71) Applicant: DAIDO STEEL CO., LTD., Nagoya (JP)

(72) Inventors: Takashi Yoshimoto, Nagoya (JP); Shinnosuke Yamada, Nagoya (JP); Koichiro Inoue, Nagoya (JP)

(73) Assignee: DAIDO STEEL CO., LTD., Nagoya (JP)

(*) Notice: Subject to any disclaimer, the term of this patent is extended or adjusted under 35 U.S.C. 154(b) by 115 days.

(21) Appl. No.: 17/321,293

(22) Filed: May 14, 2021

(65) Prior Publication Data
US 2021/0355570 A1 Nov. 18, 2021

(30) Foreign Application Priority Data
May 18, 2020 (JP) .................. 2020-086650

(51) Int. Cl.
*C22C 33/02* (2006.01)
*B33Y 70/00* (2020.01)
(Continued)

(52) U.S. Cl.
CPC ............ *C22C 33/0285* (2013.01); *B22F 1/06* (2022.01); *B33Y 70/00* (2014.12); *C22C 38/001* (2013.01); *C22C 38/02* (2013.01); *C22C 38/06* (2013.01); *C22C 38/44* (2013.01); *C22C 38/46* (2013.01); *C22C 38/58* (2013.01); *B22F 2301/35* (2013.01); *Y10T 428/12014* (2015.01)

(58) Field of Classification Search
None
See application file for complete search history.

(56) References Cited

U.S. PATENT DOCUMENTS

2015/0118095 A1* 4/2015 Wert .................. C21D 8/005
419/33
2015/0314366 A1 11/2015 Kawano
(Continued)

FOREIGN PATENT DOCUMENTS

| CN | 101294259 A | 10/2008 |
|---|---|---|
| CN | 105018851 A | 11/2015 |

(Continued)

OTHER PUBLICATIONS

Japanese Office Action, dated Jun. 14, 2022, in Japanese Application No. 2020-086650 and English Translation thereof.
(Continued)

*Primary Examiner* — Seth Dumbris
(74) *Attorney, Agent, or Firm* — MCGINN I.P. LAW GROUP, PLLC

(57) ABSTRACT

The present invention relates to a metal powder including 0.1≤C≤0.4 mass %, 0.005≤Si≤1.5 mass %, 0.3≤Mn≤8.0 mass %, 2.0≤Cr≤15.0 mass %, 2.0≤Ni≤10.0 mass %, 0.1≤Mo≤3.0 mass %, 0.1≤V≤2.0 mass %, 0.010≤N≤0.200 mass %, and 0.01≤Al≤4.0 mass %, with the balance being Fe and unavoidable impurities, and satisfying the following expression (1), 10<15[C]+[Mn]+0.5[Cr]+[Ni]<20 (1), in which [C], [Mn], [Cr] and [Ni] respectively represent the contents of C, Mn, Cr and Ni by mass %.

19 Claims, 10 Drawing Sheets

(51) Int. Cl.
  *C22C 38/00* (2006.01)
  *C22C 38/02* (2006.01)
  *C22C 38/06* (2006.01)
  *C22C 38/44* (2006.01)
  *C22C 38/46* (2006.01)
  *C22C 38/58* (2006.01)
  *B22F 1/06* (2022.01)

(56) References Cited

U.S. PATENT DOCUMENTS

| | | | |
|---|---|---|---|
| 2016/0199912 A1* | 7/2016 | Tamura | B22F 5/00 |
| | | | 75/255 |
| 2016/0215375 A1 | 7/2016 | Kawano | |
| 2016/0318103 A1* | 11/2016 | Allroth | B22F 3/1017 |
| 2018/0009031 A1* | 1/2018 | Nakamura | C22C 38/005 |
| 2019/0003021 A1 | 1/2019 | Medvedeva et al. | |
| 2019/0055627 A1 | 2/2019 | Nagatomi et al. | |
| 2019/0061001 A1 | 2/2019 | Araie et al. | |
| 2019/0368016 A1 | 12/2019 | Karamchedu et al. | |
| 2020/0024704 A1* | 1/2020 | Nakamura | C22C 38/48 |
| 2020/0080164 A1 | 3/2020 | Vartanov | |
| 2020/0180022 A1 | 6/2020 | Murakami et al. | |
| 2021/0025042 A1 | 1/2021 | Saimen | |

FOREIGN PATENT DOCUMENTS

| | | | |
|---|---|---|---|
| CN | 105821327 A | 8/2016 | |
| JP | 2015-209588 A | 11/2015 | |
| JP | 2015-221933 A | 12/2015 | |
| JP | 2015-224363 A | 12/2015 | |
| JP | 6295001 B1 | 3/2018 | |
| JP | 2019-504197 A | 2/2019 | |
| JP | 2019-173049 A | 10/2019 | |
| JP | 6601051 B2 | 11/2019 | |
| WO | WO 2017/026519 A1 | 2/2017 | |
| WO | WO 2018/078701 A1 | 5/2018 | |
| WO | WO-2020086630 A1 * | 4/2020 | ............ B22F 1/0007 |

OTHER PUBLICATIONS

Extended European Search Report dated Oct. 21, 2021 for European Patent Application No. 21174317.4-1103.
Chinese Office Action, dated Nov. 18, 2022, in Chinese Application No. 202110539006.6 and English Translation thereof.
"Application and Research of Metal Materials Science", Lanfang CUI, pp. 143-145, University of Electronic Science and Technology of China Press, Apr. 2016, with an English translation thereof.
"Casting Handbook vol. 1 Cast Iron", Foundry Institution of Chinese Mechanical Engineering Society, pp. 348-349, China Machine Press, Mar. 1993, with an English translation thereof.
Chinese Office Action dated Jun. 1, 2023 in related Chinese Application No. 202110539006.6, with an English translation thereof.

* cited by examiner

METAL POWDER

TECHNICAL FIELD

The present invention relates to a metal powder. In more detail, the present invention relates to a metal powder which, when used in additive manufacturing, can give an additive manufactured article having few cracks and little warpage and having a moderate hardness and a high thermal conductivity.

BACKGROUND

In recent years, techniques for additive manufacturing of metals are attracting attention. This is because these techniques have advantages, for example, in that (a) metallic components having complicated shapes can be formed so as to have shapes close to the final shapes, (b) the techniques have an improved freedom of design, and (c) the cutting allowance is smaller than that in conventional techniques of shaping by cutting.

The term "additive manufacturing process" means a process in which a three-dimensional structure is produced by stacking, by any of various methods, thin layers corresponding to slices obtained by horizontally cutting the three-dimensional structure. Examples of the methods for stacking such thin layers include: (a) a method in which a step of forming a thin layer of a metal powder and a step of locally melting the powder layer by irradiation with an energy beam, e.g., laser light or an electron beam, and solidifying the melt, are repeated; and (b) a method in which thin layers respectively having given shapes are stacked and diffusion-bonded.

Among such techniques, the additive manufacturing process in which a metal powder spread in a layer is irradiated with laser light to locally melt the powder layer and the molten metal is solidified is also called a selective laser-melting (SLM) method. The SLM additive manufacturing process has an advantage in that a complicated three-dimensional shape can be easily formed merely by changing the position of the site being irradiated with laser light. Consequently, in cases where this process is applied, for example, to production of a casting mold, a nonlinear or three-dimensional cooling-water channel can be freely disposed within the mold.

In the case of conducting additive manufacturing using an SLM type 3D printer, since only the upper surface of the article being shaped is rapidly heated, the residual tensile stress occurs on the upper surface of the shaped article after cooling. As a result, the shaped article is prone to deform so as to protrude downward. In the case where the deformation of the shaped article is large, this not only lowers the dimensional accuracy of the shaped article but also makes it difficult to take out the shaped article from the 3D printer after the shaping. It has hence been common to use powders of maraging steels as additive-manufacturing powders.

Maraging steels undergo martensitic transformation to expand upon rapid cooling. Maraging steels have a low hardness just after the martensitic transformation and can be hardened by aging. Use of the maraging steels in additive manufacturing hence has an advantage in that the article being shaped is less apt to crack or deform, making the additive manufacturing easy. By aging the shaped article after the additive manufacturing, a necessary hardness can be obtained.

However, the maraging steels are relatively low in thermal conductivity and toughness. Because of this, in the case where molds are produced by additive manufacturing using maraging steel powders, the molds have problems, for example, in that (a) the molds have a low cooling efficiency due to the low thermal conductivity and (b) cracks are prone to generate from the water-cooling holes because of the low toughness.

Various proposals have hitherto been made in order to overcome those problems.

For example, Patent Document 1 discloses a powder of a steel containing given amounts of C, Si, Cr, Mn, Mo, V, and N, with the balance being Fe and unavoidable impurities.

The document states that (a) conventional steels for molds, such as SKD61, SUS420J2, and maraging steels, although having high-temperature strength, have low thermal conductivities because these steels contain large amounts of elements, such as Si, Cr, Ni, and Co, which are apt to dissolve in the matrix phase, (b) when this kind of high-alloy steel is regulated by reducing the content of alloying components which lower the thermal conductivity and optimizing the content of Cr, then a high thermal conductivity can be attained while maintaining the high corrosion resistance, and (c) powders of such steel are suitable for use as powders for additive manufacturing.

Patent Document 2 discloses a method for producing a shaped article by additive manufacturing, the method including:
- a recoating step in which a material layer made of a powder of either a carbon steel or a martensitic stainless steel is formed in a shaping region,
- a solidification step in which a given irradiation region of the material layer is irradiated with laser light to form a solidified layer, and
- a temperature regulation step in which the temperature of the solidified layer is regulated so as to be $T_1 \to T_2 \to T_1$ (in which $T_1 \geq Mf$ (Mf is a martensitic-transformation finish temperature of the solidified layer), $T_1 > T_2$, and $T_2 \leq Ms$ (Ms is a martensitic-transformation start temperature of the solidified layer)).

The document states that (a) in additive manufacturing, the solidified layer generally contracts during cooling and, hence, tensile stress remains in the solidified layer, (b) in cases where additive manufacturing has been conducted using a material which undergoes martensitic transformation, since the solidified layer expands at the time when it undergoes martensitic transformation, the volume contraction is occurred when the solidified layer is cooled, and the tensile stress due to the volume contraction are lessened, making it possible to inhibit the shaped article from deforming, (c) by controlling the $T_1$ and the $T_2$ in the temperature regulation step, the transformation amount (=expansion amount) can be controlled, and (d) since the Ms and the Mf rise and fall depending on the content of carbon in the material, the method described in the document can be made applicable to various materials by regulating the carbon contents in the materials.

Patent Documents 3 to 5 disclose steels for molds, the steels each containing given amounts of C, Si, Mn, Cr, Mo, and V, with the balance being Fe and unavoidable impurities.

The documents state that (a) both high high-temperature strength and a high thermal conductivity can be attained by reducing the contents of elements, such as Si, Cr, Ni, and Co, which lower the thermal conductivity, and increasing the contents of elements, such as Mn, Mo, and V, which enhance the high-temperature strength, and (b) powders made of such material are suitable for use as powders for additive manufacturing.

Patent Document 6 discloses a powder for molds which contains given amounts of C, Si, Mn, Cr, V, Mo, W, and Co, with the balance being Fe and unavoidable impurities, and in which the total content of P, S, and B is 0.02 mass % or less.

The document states that (a) additive manufacturing is accompanied with the rapid cooling and solidification of the shaped article, and use of a powder for additive manufacturing which contains P, S, and B in a relatively large amount results in segregation of these elements at grain boundaries during the rapid cooling and solidification to promote solidification cracking and (b) by regulating the total content of P, S, and B in a powder for additive manufacturing to 0.02 mass % or less, this powder, when used in additive manufacturing, can be made to give shaped articles inhibited from suffering solidification cracking.

Furthermore, Patent Document 7 discloses a hot work tool steel which, although not a metal powder for additive manufacturing, contains given amounts of C, Si, Mn, Cr, Mo, V, N, H, and S, with the balance being Fe and unavoidable impurities.

The document states that this hot work tool steel is excellent in terms of resistance to hot-working wear, unsusceptibility to developing a large crack, and heat check resistance.

In conducting additive manufacturing using an SLM type 3D printer, it is thought that use of a powder of a steel which contains carbon in an amount of 0.1% or more and undergoes martensitic transformation to harden (e.g., a powder of a die steel for hot working or martensitic stainless steel) as a metal powder may be effective in compensating for the drawbacks of maraging steels. However, in cases where conventional die steels for hot working such as SKD61 are used as such in additive manufacturing, there is a problem in that the shaped articles in the as-shaped state have an exceedingly high hardness and are prone to crack.

In order to overcome that problem, Patent Document 1 proposes a steel powder which has a lower carbon content than that of conventional die steels for hot working to attain a reduced as-shaped-state hardness and thereby prevent cracking during shaping and which has a reduced Si content to attain a heightened thermal conductivity. However, use of the method described in Patent Document 1, although effective in avoiding cracking, results in insufficient relaxation of the thermal stress and there are hence cases where the shaped article has reduced dimensional accuracy or is difficult to take out of the 3D printer after the shaping.

Patent Document 2 discloses a method in which in conducting additive manufacturing using a carbon steel or martensitic stainless steel (SUS420J2) as a metal powder, the temperature of the solidified layer is raised and lowered around the Ms point. By this method, less deformed shaped articles can be obtained because residual tensile stress that generated during cooling after the shaping has been relaxed by volume expansion due to martensitic transformation.

However, the current 3D printers have limitations on the highest shaping-region temperatures because of limitations in the devices. Consequently, the kinds of steel to which the method described in Patent Document 2 can be applied are limited to ones having an Ms point of about 300° C. or lower (e.g., carbon steels and tough hardening steels which have high carbon contents, martensitic stainless steels, and maraging steels having high nickel contents), and the method is not applicable to steels having an Ms point exceeding 300° C. Meanwhile, in cases where the content of C is increased in order to lower the Ms point to or below 300° C., this results in an exceedingly high as-shaped-state hardness and the shaped article is prone to crack. Although increasing the content of an element other than C can be effective in lowering the Ms point without excessively heightening the hardness, this results in a decrease in thermal conductivity, etc., making it difficult to obtain properties required of products.

Patent Document 1: Japanese Patent No. 6601051
Patent Document 2: Japanese Patent No. 6295001
Patent Document 3: JP-A-2015-209588
Patent Document 4: JP-A-2015-221933
Patent Document 5: JP-A-2015-224363
Patent Document 6: JP-A-2019-173049
Patent Document 7: JP-T-2019-504197 (The term "JP-T" as used herein means a published Japanese translation of a PCT patent application.)

SUMMARY

An object of the present invention is to provide a metal powder which, when used in additive manufacturing, can give an additive manufactured article having few cracks and little warpage and having a moderate hardness.

Another object of the present invention is to provide a metal powder which, when used in additive manufacturing, can give an additive manufactured article having few cracks and little warpage and having a moderate hardness and a high thermal conductivity.

Namely, the present invention relates to the following configurations (1) to (4).
(1) A metal powder including
0.1≤C≤0.4 mass %,
0.005≤Si≤1.5 mass %,
0.3≤Mn≤8.0 mass %,
2.0≤Cr≤15.0 mass %,
2.0≤Ni≤10.0 mass %,
0.1≤Mo≤3.0 mass %,
0.1≤V≤2.0 mass %,
0.010≤N≤0.200 mass %, and
0.01≤Al≤4.0 mass %,
with the balance being Fe and unavoidable impurities, and satisfying the following expression (1):

$$10<15[C]+[Mn]+0.5[Cr]+[Ni]<20 \qquad (1)$$

in which [C], [Mn], [Cr] and [Ni] respectively represent the contents of C, Mn, Cr and Ni by mass %.
(2) The metal powder according to (1), which further satisfies the following expression (2):

$$2[C]+[Si]+0.75[Mn]+0.75[Cr]<8 \qquad (2)$$

in which [C], [Si], [Mn] and [Cr] respectively represent the contents of C, Si, Mn, and Cr by mass %.
(3) The metal powder according to (1) or (2), which has a number frequency $D_{50}$ of 10 μm or more and an avalanche angle of 45° or less.
(4) The metal powder according to any one of (1) to (3), which is for use in additive manufacturing.

In cases where the metal powder including given elements and satisfying expression (1) is used to conduct additive manufacturing, residual tensile stress which has generated during cooling after the shaping is relaxed by volume expansion due to martensitic transformation. As a result, an additive manufactured article having few cracks and little deformation can be obtained.

Furthermore, by optimizing the contents of alloying elements so as to satisfy expression (2), an additive manufactured article having a thermal conductivity (about 20

W/(m·K) or more) higher than those of conventional maraging steels while retaining the reduced deformation and high hardness can be obtained.

EMBODIMENTS

Figure 1:
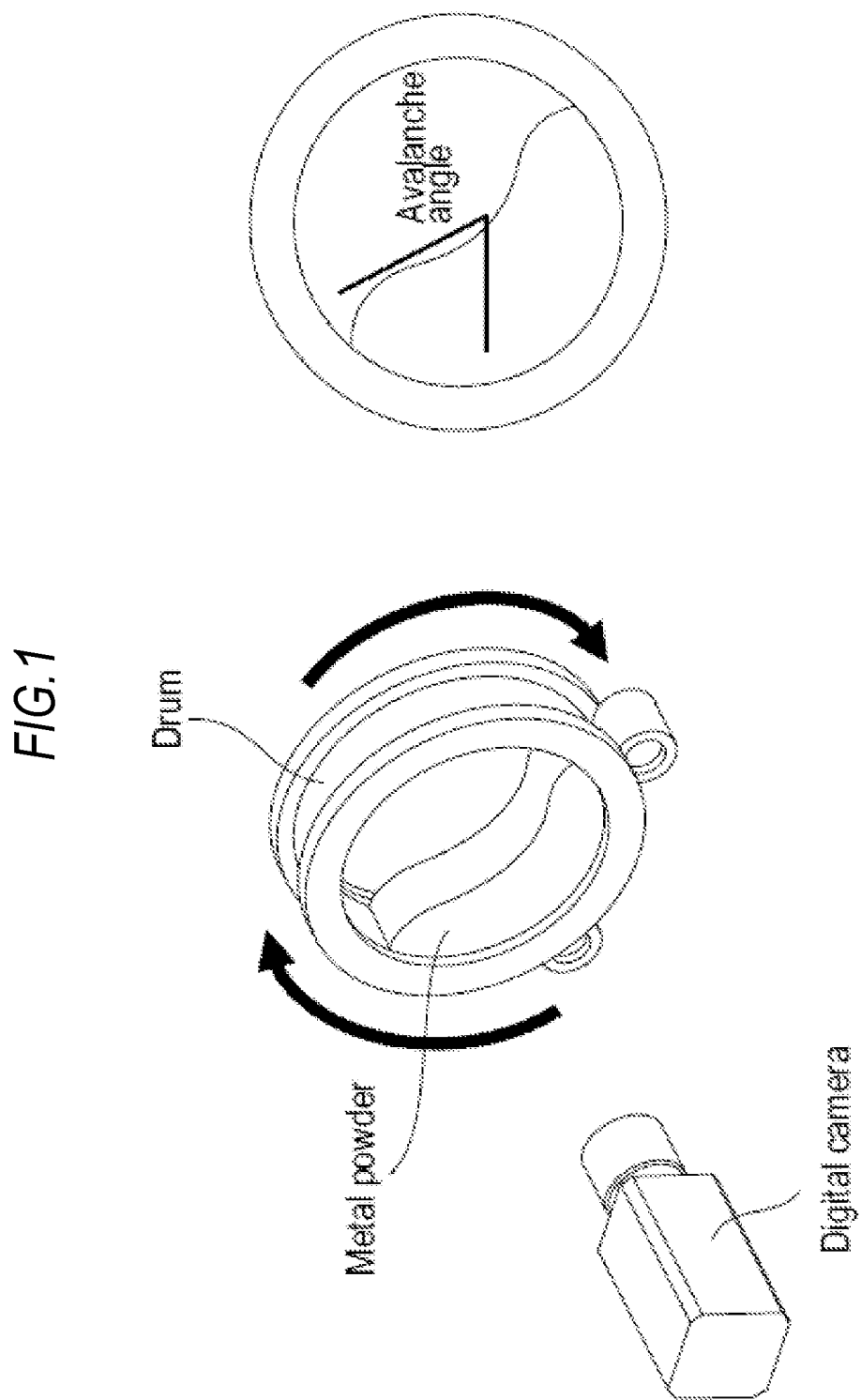
FIG. 1 is a schematic view illustrating a method for measuring avalanche angle.

Embodiments of the present invention are described in detail below.
1. Metal Powder
1.1. Components The metal powder according to the present invention contains the following elements, with the balance being Fe and unavoidable impurities. The kinds of the additive elements, ranges of the contents of the components, and reasons for the content ranges are as follows.

(1) 0.1≤C≤0.4 Mass %:

C is an important element for regulating the strength. The hardness just after additive manufacturing is in proportion to C content; the higher the content of C, the higher the hardness just after additive manufacturing. C is also an element capable of effectively lowering the Ms point. For obtaining such effects, the content of C needs to be 0.1 mass % or higher. The content of C is preferably 0.15 mass % or higher, more preferably 0.20 mass % or higher.

Meanwhile, in case where the content of C is too high, the hardness just after additive manufacturing is too high and this is causative of cracking. Consequently, the content of C needs to be 0.4 mass % or less. The content of C is preferably 0.35 mass % or less, more preferably 0.30 mass % or less.

(2) 0.005≤Si≤1.5 Mass %:

Si serves to improve the machinability for machining. Since additive manufactured articles are produced so as to have shapes close to final shapes, the cutting allowance for machining is small and the machinability need not be always high. However, excessively reducing the Si content is not economical because this results in an increase in the cost of refining in production. Consequently, the content of Si needs to be 0.005 mass % or higher. The content of Si is preferably 0.02 mass % or higher, more preferably 0.05 mass % or higher.

Meanwhile, in the case where the content of Si is too high, this results in considerable decreases in thermal conductivity and toughness. Consequently, the content of Si needs to be 1.5 mass % or less. The content of Si is preferably 0.20 mass % or less, more preferably 0.10 mass % or less.

(3) 0.3≤Mn≤8.0 Mass %:

Mn is an element necessary for ensuring quench hardenability and is also an element which effectively lowers the Ms point. In the case where the content of Mn is too low, this results in reduced quench hardenability or an increase in Ms point. Consequently, the content of Mn needs to be 0.3 mass % or higher. The content of Mn is preferably 0.35 mass % or higher.

Meanwhile, in the case where the content of Mn is too high, this results in an Ms point around room temperature and in a considerably reduced hardness. Consequently, the content of Mn needs to be 8.0 mass % or less. The content of Mn is preferably 2.0 mass % or less, more preferably 1.0 mass % or less.

(4) 2.0≤Cr≤15.0 Mass %:

Cr is an element necessary for ensuring quench hardenability and corrosion resistance. In the case where the content of Cr is too low, this results in reduced quench hardenability or extremely poor corrosion resistance. Consequently, the content of Cr needs to be 2.0 mass % or higher. The content of Cr is preferably 2.9 mass % or higher.

Meanwhile, even if Cr is added in an unnecessarily large amount, the effect on quench hardenability and corrosion resistance is not enhanced any more, bringing about no profit. Consequently, the content of Cr needs to be 15.0 mass % or less. The content of Cr is preferably 14.0 mass % or less, more preferably 13.0 mass % or less.

(5) 2.0≤Ni≤10.0 Mass %:

Ni is an element necessary for ensuring quench hardenability and is also an element which effectively lowers the Ms point. In case where the content of Ni is too low, it is difficult to lower the Ms point while maintaining the hardness and the thermal conductivity. Consequently, the content of Ni needs to be 2.0 mass % or higher. The content of Ni is preferably 3.2 mass % or higher, more preferably 4.0 mass % or higher.

Meanwhile, in case where the content of Ni is too high, this results in a considerably lowered Ms point and a reduced hardness after additive manufacturing. Consequently, the content of Ni needs to be 10.0 mass % or less. The content of Ni is preferably 8.5 mass % or less, more preferably 6.5 mass % or less.

(6) 0.1≤Mo≤3.0 Mass %:

Mo serves to cause the additive manufactured article to undergo secondary hardening when tempered after the additive manufacturing. In the case where the content of Mo is too low, the secondary hardening less contributes and this results in an insufficient hardness if the tempering temperature is high. Furthermore, in the case where the content of Mo is too low, a high-temperature strength becomes insufficient. Consequently, the content of Mo needs to be 0.1 mass % or higher. The content of Mo is preferably 0.2 mass % or higher, more preferably 0.5 mass % or higher.

Meanwhile, in the case where the content of Mo is too high, not only the effect of improving strength is not enhanced any more but also fracture toughness decreases. Consequently, the content of Mo needs to be 3.0 mass % or less. The content of Mo is preferably 2.9 mass % or less, more preferably 1.8 mass % or less.

(7) 0.1≤V≤2.0 Mass %:

V forms a carbide and a nitride to finely disperse in the steel, thereby serving to inhibit the crystal grains from enlarging during quench-hardening. Furthermore, the V which has been dissolved upon quench-hardening is precipitated as a carbonitride of V by tempering conducted at a temperature around 600° C., thereby contributing to high-temperature hardness and an improvement in unsusceptibility to softening through secondary hardening. In addition, although C is utilized in the present invention in order to effectively lower the Ms point, V serves to cause C to be precipitated as VC by tempering conducted at around 600° C. and thus excluded from the matrix, thereby heightening the Ms point. In cases where an increase in Ms point occurs during the tempering, the residual γ undergoes martensitic transformation during cooling after the tempering to improve the hardness. For obtaining this effect, the content of V needs to be 0.1 mass % or higher. The content of V is preferably 0.2 mass % or higher, more preferably 0.4 mass % or higher.

Meanwhile, even if V is added in an unnecessarily large amount, the effects thereof are not enhanced any more, bringing about no profit. Consequently, the content of V needs to be 2.0 mass % or less. The content of V is preferably 1.5 mass % or less, more preferably 1.3 mass % or less.

(8) 0.010≤N≤0.200 Mass %:

N is an element which comes into the powder when the melt is powdered by atomization in nitrogen. In the case where the content of N is reduced to an unnecessarily low level, this results in a considerable increase in production cost. Consequently, the content of N needs to be 0.010 mass % or higher. The content of N is preferably 0.011 mass % or higher, more preferably 0.012 mass % or higher.

Meanwhile, in the case where the content of N is too high, the formation of nitrides is promoted, resulting in a considerable decrease in toughness. Consequently, the content of N needs to be 0.200 mass % or less. The content of N is preferably 0.100 mass % or less, more preferably 0.050 mass % or less.

(9) 0.01≤Al≤4.0 Mass %:

In the present invention, the Ms point is regulated mainly with C and Ni as will be described later. Specifically, in cases where the content of C is reduced in order to lower the hardness of the shaped article of just after additive manufacturing, this results in an increase in Ms point. This increase in Ms point is diminished by adding Ni. However, excessive addition of Ni may cause cases where no increase in Ms point occurs even after tempering and residual γ is yielded in a large amount. As a result, there are cases where a sufficient hardness is not obtained even after tempering or where the dissolved Ni affects the steel to lower the thermal conductivity, which is a property required of molds. In order to overcome this problem, Al is added in the present invention.

In the steel containing Al, the Al forms an intermetallic compound with Ni during tempering and the intermetallic compound precipitates. The precipitation of the intermetallic compound not only contributes to an improvement in hardness but also serves to reduce the amount of Ni dissolved in the matrix. A reduction in the amount of Ni dissolved in the matrix not only raises the Ms point and reduces the content of residual γ after tempering but also improves the thermal conductivity. For obtaining such effects, the content of Al needs to be 0.01 mass % or higher.

Meanwhile, in the case where the content of Al is too high, this reduces, rather than increases, the thermal conductivity. Consequently, the content of Al needs to be 4.0 mass % or less. The content of Al is preferably 2.5 mass % or less, more preferably 1.5 mass % or less.

(10) Unavoidable Impurities:

There are cases where the metal powder according to the present invention contains the following components in the amounts shown below. In such cases, these components are regarded as unavoidable impurities. P≤0.05 mass %, S≤0.01 mass %, Cu≤0.30 mass %, W≤0.10 mass %, O≤0.05 mass %, Co≤0.3 mass %, Nb≤0.004 mass %, Ta≤0.05 mass %, Ti≤0.05 mass %, Zr≤0.05 mass %, B≤0.005 mass %, Ca≤0.005 mass %, Se≤0.03 mass %, Te≤0.005 mass %, Bi≤0.01 mass %, Pb≤0.03 mass %, Mg≤0.02 mass %, and REM (rare earth metal)≤0.01 mass %.

1.2. Component Balance 1.2.1. Expression (1): Ms Point

The metal powder according to the present invention needs to satisfy the following expression (1).

$$10<15[C]+[Mn]+0.5[Cr]+[Ni]<20 \quad (1)$$

in which [C], [Mn], [Cr] and [Ni] respectively represent the contents of C, Mn, Cr and Ni by mass %.

"15[C]+[Mn]+0.5[Cr]+[Ni]" (hereinafter referred to also as "variable A") in expression (1) correlates with the Ms point of the metal powder. The elements included in variable A each serve to lower the Ms point. In cases where variable A in the metal powder according to the present invention is optimized so as to satisfy expression (1), the metal powder can have an Ms point within a range suitable for additive manufacturing (specifically about 50° C.-280° C.).

In the case where the metal powder has too low the Ms point, residual γ remains in excess after additive manufacturing, making it impossible to obtain a necessary hardness. In addition, even when the additive manufactured article is cooled to room temperature after the additive manufacturing, the effect of diminishing deformation by transformation expansion is not obtained because of too small an amount of martensitic transformation. Consequently, the Ms point is preferably 50° C. or higher. From the standpoint of attaining an Ms point not lower than 50° C., it is preferable that valuable A is less than 20.

Meanwhile, for obtaining the effect of diminishing deformation by transformation expansion, it is necessary that the additive manufactured article should be heated after the additive manufacturing at a temperature which is lower than the Ms point and is within a range where the martensitic transformation does not finish completely. The existing devices for additive manufacturing can heat the shaped articles up to 200° C. at the most because of limitations in the equipment. In the case of an additive manufactured article having an Ms point of 280° C. or higher, the martensitic transformation mostly finishes by heating to 200° C. because the heating temperature is low, making it impossible to obtain the effect of diminishing deformation by transformation expansion. Even if the additive manufactured article having an Ms point of 280° C. or higher can be heated to 200° C. or higher, the necessary heating temperature is not lower than temperatures which cause bainitic transformation and, hence, expansion due to bainitic transformation occurs during the shaping, making it impossible to obtain the effect of diminishing deformation by transformation expansion. Consequently, the Ms point is preferably 280° C. or lower. From the standpoint of attaining an Ms point not higher than 280° C., it is preferable that variable A exceeds 10.

In the case of producing a mold using a die steel for hot working such as SKD61 or a martensitic stainless steel such as SUS420J, a method in common use is to conduct spheroidizing annealing to lower the hardness and then shape the work by machining. However, excessively adding Mn and/or Ni to those steels makes it difficult to lower the hardness by spheroidizing annealing. Because of this, the total content of Mn and Ni in those steels has usually been regulated to 2 mass % or less.

Meanwhile, in additive manufacturing, substantially no machining is performed and there is hence no need of conducing spheroidizing annealing after the additive manufacturing. In the case where the content of C is too high, this metal powder gives additive manufactured articles having too high a hardness, which is causative of cracking. Although it is necessary to reduce the content of C for inhibiting cracking, a reduction in C content results in an increase in Ms point.

By relatively reducing the content of C and relatively increasing the total content of Mn and Ni so as to satisfy expression (1), the cracking of the additive manufactured articles can be inhibited and, at the same time, the Ms point can be kept in the range suitable for additive manufacturing.

1.2.2. Expression (2): Thermal Conductivity

It is preferable that the metal powder according to the present invention further satisfies the following expression (2).

$$2[C]+[Si]+0.75[Mn]+0.75[Cr]<8 \quad (2)$$

in which [C], [Si], [Mn] and [Cr] respectively represent the contents of C, Si, Mn, and Cr by mass %.

"$2[C]+[Si]+0.75[Mn]+0.75[Cr]$" (hereinafter referred to also as "variable T") in expression (2) correlates with the thermal conductivity of the metal powder. The elements included in variable T each serve to lower the thermal conductivity. In cases where variable T in the metal powder according to the present invention is optimized so as to satisfy expression (2), the metal powder can have a thermal conductivity within a range (specifically about 20 W/(m·K) or higher) suitable for molds required to have high cooling ability.

Thermal conductivity is a property crucially important for molds having water-cooling holes. The purpose of forming water-cooling holes in a mold is to efficiently cool the mold to accelerate the cooling of the shaped article in contact with the mold. From this standpoint, it is preferable that materials for use in forming molds having water-cooling holes have a high thermal conductivity.

The thermal conductivities of 18Ni maraging steels in common use in additive manufacturing are less than 20 W/(m·K). Consequently, from the standpoint of obtaining a mold having higher cooling ability than those steels, it is preferable that the thermal conductivity of the metal powder is 20 W/(m·K) or higher. Variable T is preferably less than 8 for attaining such thermal conductivity.

1.3. Powder Properties

In cases where it is used with an SLM type 3D printer, the metal powder needs to be evenly spread before being shaped with a laser. In order for the metal powder to be evenly spread, flowability is important for the metal powder. For ensuring the flowability, it is necessary to optimize the powder properties of the metal powder (in particular, number frequency $D_{50}$ and avalanche angle).

1.3.1. Number Frequency $D_{50}$

The term "number frequency $D_{50}$ (μm)" means the 50% number-cumulative particle diameter (median diameter) of a powder. Examples of methods for $D_{50}$ determination include (a) a method in which a particle size distribution analyzer based on the laser diffraction/scattering method is used to determine $D_{50}$, (b) a method in which a particle image analyzer is used to determine $D_{50}$, and (c) a method in which a Coulter counter is used to determine $D_{50}$.

"$D_{50}$" as used in the present invention means median diameter determined with a particle image analyzer.

In general, the smaller the $D_{50}$, the higher the relative content of a fine powder (powder having particle diameters of 10 μm or less). Attractive forces occurring between particles, such as van der Waals force and electrostatic force, are enhanced as the particle diameter becomes smaller. Because of this, powders having too small values of $D_{50}$ are prone to agglomerate and show reduced flowability. Consequently, the metal powder preferably has a $D_{50}$ of 10 μm or larger. The $D_{50}$ thereof is preferably 20 μm or larger, more preferably 30 μm or larger.

Meanwhile, in the case where the metal powder has too large a $D_{50}$, the flowability is governed more by frictional force occurring on the powder surface than by the attractive forces occurring between the particles. This powder hence undergoes increased shear resistance during powder flowing and has reduced flowability. Consequently, the $D_{50}$ thereof is preferably 50 μm or less.

1.3.2. Avalanche Angle

Examples of methods for evaluating metal powder flowability include (a) "Metal Powders—Flow Rate Measuring Method" as provided for in JIS Z2502:2012, (b) ASTM B213, Standard Test Methods for Flow Rate of Metal Powders Using the Hall Flowmeter Funnel, and (c) ASTM B964, Standard Test Methods for Flow Rate of Metal Powders Using the Carney Funnel.

Meanwhile, examples of methods for flowability evaluation suitable for the step of powder spreading in 3D metal printers include a method in which avalanche angle is measured, the avalanche angle being measurable with a revolution powder analyzer manufactured by Mercury Scientific Inc. In the present invention, this avalanche angle is used as an index to the flowability of metal powders.

FIG. 1 shows a schematic view illustrating a method for measuring avalanche angle. First, a given amount of a metal powder is introduced into a cylindrical vessel (drum). Subsequently, this drum is rotated at a low speed, upon which the layer of the metal powder is pulled up as the drum rotates. Thereafter, an avalanche occurs at the time when a balance between the interparticulate attractive forces and gravity has been lost.

In the present invention, such avalanche phenomena which occurred periodically in the rotating drum were continuously imaged with a digital camera. Subsequently, the captured images were subjected to image analysis to measure, multiple times, the angle of the slant surface of the powder layer at the time when an avalanche has occurred, and an average of the measured angles was taken as the avalanche angle.

In general, small avalanche angles indicate that the attractive forces between the particles are low and the flowability of the metal powder is satisfactory. The avalanche angle usually has a value of 30°-60°, although this depends on the $D_{50}$ of the metal powder. From the standpoint of more evenly spreading the metal powder over shaping regions in 3D printers, it is preferable that the avalanche angle thereof is 45° or less. The avalanche angle thereof is preferably 43° or less, more preferably 40° or less, still more preferably 35° or less.

1.3.3. Apparent Density, Tap Density, and Hausner Ratio

Examples of methods for determining apparent density include (a) "Metal Powders—Apparent Density Measuring Method" as provided for in JIS Z2504:2012 and (b) a method according to ASTM B212, Standard Test Method for Apparent Density of Free-Flowing Metal Powders Using the Hall Flowmeter Funnel.

The term "apparent density $\rho_{bulk}$" as used in the present invention means a value obtained by "Metal Powders—Apparent Density Measuring Method" as provided for in JIS Z2504:2012. Metal powders can usually have apparent densities of about 3.0 g/cc-6.0 g/cc.

Examples of methods for determining tap density include (a) "Metal Powders—Tap Density Measuring Method" as provided for in JIS Z2512:2012 and (b) a method according to ASTM B527, Standard Test Method for Tap Density of Metal Powders and Compounds.

The term "tap density $\rho_{tapped}$" as used in the present invention means a value obtained by "Metal Powders—Tap Density Measuring Method" as provided for in JIS Z2512:2012. Metal powders can usually have tap densities of about 3.0 g/cc-6.0 g/cc.

The term "Hausner ratio" means the ratio ($=\rho_{tapped}/\rho_{bulk}$) of the tap density ($\rho_{tapped}$) to the apparent density ($\rho_{bulk}$) of the metal powder. A small Hausner ratio of a metal powder generally means that this metal powder has low interparticulate interaction and high flowability. Conversely, a large Hausner ratio of a metal powder generally indicates that this metal powder has high interparticulate interaction and low flowability. Metal powders usually have Hausner ratios of up to 1.25.

1.3.4. Particle Shape

The shape of the particles of the metal powder may be spherical or may be indefinite. In general, metal powders composed of spherical particles show higher flowability than metal powders composed of particles of indefinite shapes.

1.4. Uses

The metal powder according to the present invention can be used in various applications, and is especially suitable for use as a metal powder for additive manufacturing.

2. Methods for Producing the Metal Powder

In the present invention, there are no particular limitations on methods for producing the metal powder. Examples of methods for producing the metal powder include a gas atomization method, a water atomization method, a plasma atomization method, a plasma rotation-electrode method, and a centrifugal atomization method.

For example, in the case of producing the metal powder using the gas atomization method, a melt is caused to fall continuously from the bottom of a tundish and a high-pressure gas is blown against the melt to pulverize and solidify the melt. As this high-pressure gas, use is made of an inert gas such as nitrogen, argon, or helium. In the powder production by the gas atomization method, there are cases where impurities such as P, S, Cu, Co, Ti, Zr, and Nb unavoidably come into the metal powder.

The metal powder may be produced also by a method in which two or more metal powders are mixed together and subjected to, for example, mechanical alloying.

The metal powder which has been produced by any of those methods may be subjected to a spheroidizing treatment with a reducing hot plasma. Alternatively, after the powder production, the surface of the metal powder may be covered with an appropriate amount of nanoparticles in order to improve the flowability of the metal powder. Furthermore, although the particle size distribution of the metal powder can be regulated by controlling the production conditions, it is possible to regulate the particle size distribution by classification using a wet type cyclone, a dry type cyclone, dry type sieves, ultrasonic sieves, etc.

3. Method for Producing Additive Manufactured Article

3.1. 3D Metal Printer

Examples of methods for additive manufacturing using a 3D metal printer include a powder-bed melting/bonding method, a directional-energy deposition method, and a binder jetting method. During the shaping, the additive manufactured article may be machined.

The following explanation is given on a selective laser-melting method (SLM method), which is a kind of powder-bed melting/bonding method. Shaping by the powder-bed melting/bonding method includes (a) producing data on each of slices of tens of micrometers from three-dimensional shape data (e.g., STL data) produced with a 3D-CAD or the like and (b) selectively irradiating a powder bed with light while scanning the heat source using the slice data, thereby forming a sintered layer, and the sintered layer is stacked.

Figure 2:
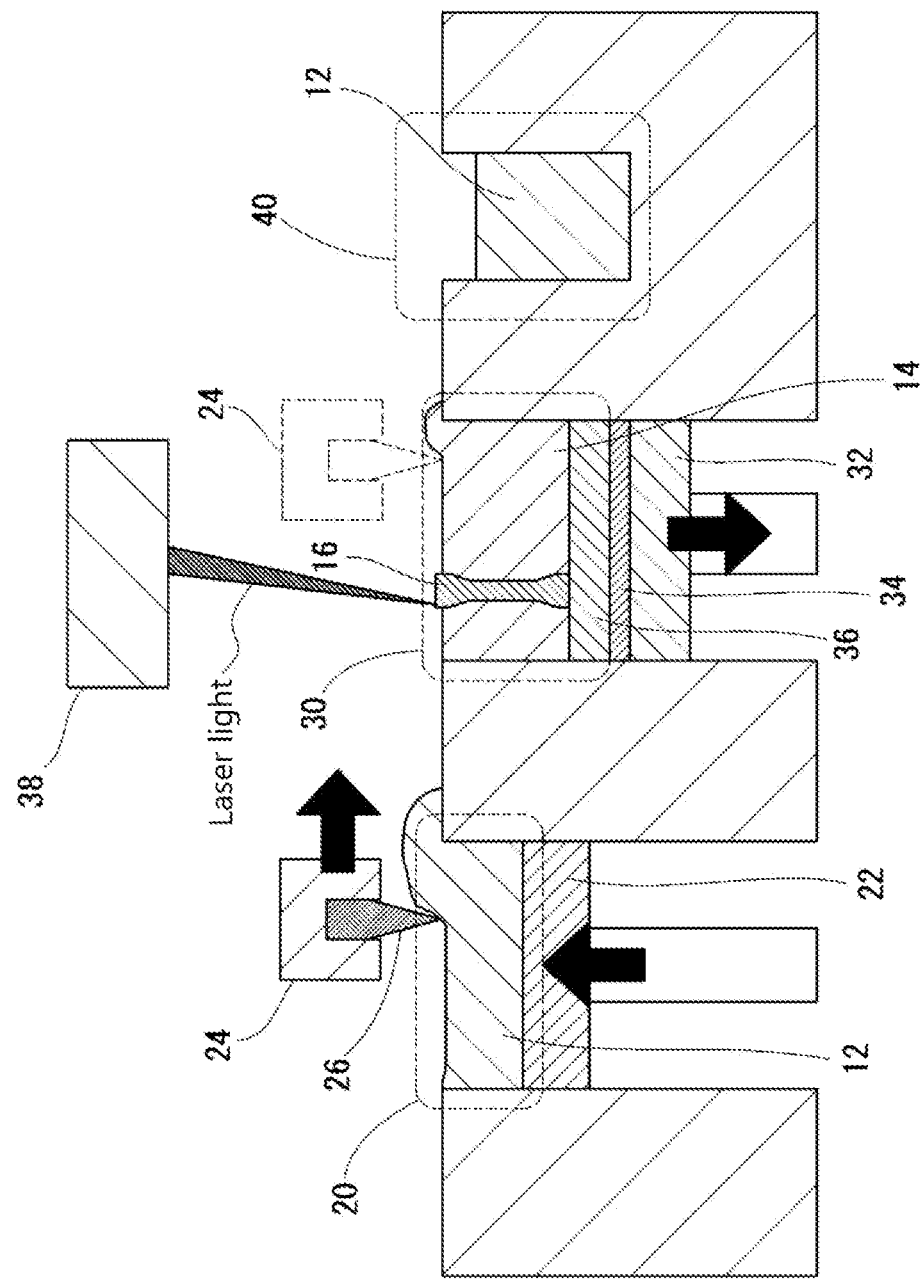
FIG. 2 is a schematic view of a 3D metal printer.

A schematic view of a 3D metal printer is shown in FIG. 2. As FIG. 2 shows, the 3D metal printer 10 includes a material bucket 20, a material stage 30, and an excess-material box 40.

The bottom of the material bucket 20 is equipped with an elevator plate 22 which can ascend and descend vertically, and a space on the elevator plate 22 is filled with a metal powder 12. A coater 24 for feeding the metal powder 12 in an appropriate amount to the material stage 30 is disposed over the material bucket 20. The end of the coater 24 is equipped with a blade 26 for scraping the metal powder 12. The material of the blade 26 is not particularly limited. Examples of the material of the blade 26 include silicone rubbers, ceramics, and high-speed steels.

The bottom of the material stage 30 is equipped with an elevator plate 32 which can ascend and descend vertically. A heater 34 is disposed on the upper surface of the elevator plate 32, and a base plate 36 is disposed on the upper surface of the heater 34. A laser light irradiator 38 is disposed over the material stage 30. As a heat source for melting the metal powder 12, an electron beam may be used in place of laser light.

A powder bed 14 filled with metal powder is formed in a space on the base plate 36. FIG. 2 illustrates an additive manufactured article 16, which is formed and is in the state of having been embedded in the powder bed 14.

The heater 34 is for heating both a base plate 36 and an additive manufactured article 16 which is being produced thereon, at a given temperature throughout the period from before the shaping to completion of the shaping. By heating the additive manufactured article 16 during the shaping, the additive manufactured article 16 can be inhibited from deforming or cracking. Heating temperatures up to 200° C. are generally used. The kind of the heater 34 is not particularly limited. Examples of the heater 34 include radiant heaters, sheathed heaters, and high-frequency heaters.

The example shown in FIG. 2 employs a metal powder 12 feeding method in which the metal powder 12 is scraped away with the coater 24 equipped with the blade 26. However, other feeding methods may be used. Examples of the other feeding methods include: (a) a method in which a coater (not shown) having a powder reservoir is used in such a manner that a powder is continuously discharged from the coater at a given rate over the material stage 30 and is spread at the same time with a blade of the coater; and (b) a method in which a powder spread on the material stage 30 is pressed and compacted with a tungsten-alloy roller to thereby form a powder bed 14.

An excess-material box 40 is for temporarily retaining the excess metal powder 12 which is yielded when the metal powder 12 fed to the material stage 30 is scraped away with the coater 24.

3.2. Method of Using the 3D Metal Printer

An additive manufactured article 16 is produced using the 3D metal printer 10 shown in FIG. 2, in the following manner.

3.2.1. Spreading of Powder

First, the elevator plate 22 is raised over a given distance to push up the metal powder 12 retained in the material bucket 20. Simultaneously therewith, the elevator plate 32 is lowered to form a space for newly spreading a metal powder 12 on the material stage 30.

Next, the coater 24 is moved from the material bucket 20 side toward the excess-material box 40 side. Thus, some of the metal powder 12 lying in the material bucket 20 is scraped away by the blade 26 and spread in the space on the material stage 30, thereby giving a powder bed 14. Meanwhile, the excess metal powder 12 which has passed over the material stage 30 is discharged into the excess-material box 40.

In the case where the rate of spreading with the coater 24 is too low, this results in a decrease in operation efficiency. It is hence preferable that the spreading rate is 10 mm/s or higher. The spreading rate is preferably 50 mm/s or higher, more preferably 100 mm/s or higher.

Meanwhile, in the case where the spreading rate is too high, the powder bed 14 has enhanced surface irregularities. The enhanced surface irregularities of the powder bed 14 enhance unevenness in melting during shaping and promote the formation of void defects. It is hence preferable that the spreading rate is 400 mm/s or less. The spreading rate is preferably 200 mm/s or less.

3.2.2. Irradiation with Laser Light

Next, while keeping the base plate 36 at a given temperature using the heater 34, laser light is emitted from the laser light irradiator 38 toward the powder bed 14. The metal powder 12 is locally melted by the irradiation and solidifies on the surface of an additive manufactured article 16 which has been formed. As a result, a thin layer is newly formed on the additive manufactured article 16.

Such spreading of a metal powder and such formation of a thin layer by irradiation with laser light are repeated necessary times.

Important for the shaping process are the output of a heat source, scanning speed, convergence diameter of the heat source, scanning pitch, and thickness of each of the powder layers to be stacked. The energy density (E) of the heat source is represented by the following expression (3):

$$E\ (J/mm^3) = P/(v \times s \times d) \quad (3)$$

where

P is the output (W) of the heat source, v is the scanning speed (mm/s) of the heat source, s is scanning pitch (mm), and d is the thickness (mm) of each layer.

In performing additive manufacturing using the metal powder according to the present invention, if the energy density (E) of the heat source is too low, there is a possibility that unmelted portions might remain because of a shortage in quantity of heat, resulting in a shaped article having voids therein. It is hence preferable that E is 30 $J/mm^3$ or higher. E is preferably 40 $J/mm^3$ or higher.

Meanwhile, in case where E is too high, excess energy is given to the powder layer and this results in penetration shape called micro keyholes, which have a slender shape penetrating to around the bottom of the melt pool. In case where the melted portion, during solidification after laser-light passing, is in the state of being insufficiently filled with the molten metal, microvoid defects are formed to lower the density of the shaped article. It is hence preferable that E is 120 $J/mm^3$ or less. E is preferably 100 $J/mm^3$ or less.

From the standpoint of attaining such values of E, the output (P) of the heat source is preferably 50 W-350 W. The scanning speed (v) of the heat source is preferably 300 mm/s-3,000 mm/s. The scanning pitch (s) is preferably 0.02 mm-0.20 mm. The thickness (d) of each of the layers to be stacked is preferably 10 μm-200 μm. Incidentally, d has the same meaning as the slice width in the STL data.

The convergence diameter of the heat source is focus diameter in the case of laser light and is beam diameter in the case of an electron beam. In the case of using laser light as the heat source, the convergence diameter is preferably 50 μm-500 μm, more preferably 50 μm-300 μm. In the case of using an electron beam as the heat source, the convergence diameter is preferably 200 μm-1,000 μm.

From the standpoint of inhibiting oxidation, the atmosphere for the shaping is preferably an inert gas, such as argon gas or nitrogen gas, or a reduced-pressure atmosphere including a vacuum.

In the case of using an electron beam as the heat source, it is preferred to prevent the diffusion of electrons to heighten the energy density of the beam. From this standpoint, the atmosphere for the shaping is preferably a reduced-pressure atmosphere, in particular, a vacuum.

4. Effects

The C, Mn, Cr, and Ni in the steel each serve to lower the Ms point. Because of this, by reducing the relative content of C and simultaneously optimizing the contents of those elements so as to satisfy expression (1), the Ms point can be kept in a range (about 50° C.-280° C.) suitable for producing additive manufactured articles reduced in deformation, without excessively heightening the as-shaped-state hardness.

Meanwhile, the V serves to combine with C to form VC, thereby reducing the amount of C dissolved in the matrix (i.e., serves to heighten the Ms point). Likewise, the Al serves to combine with Ni to form NiAl, thereby reducing the amount of Ni dissolved in the matrix (i.e., serves to heighten the Ms point).

Because of this, in cases where the metal powder containing the given elements and satisfying expression (1) is used to conduct additive manufacturing, residual tensile stress which has generated during cooling after the shaping is relaxed by the volume expansion due to martensitic transformation. As a result, an additive manufactured article having few cracks and little deformation can be obtained.

Furthermore, in cases where the metal powder containing appropriate amounts of V and Al is used to conduct additive manufacturing and the additive manufactured article is tempered after the additive manufacturing, then VC and NiAl precipitate in the steel to heighten the Ms point of the matrix. As a result, martensitic transformation proceeds during cooling after the tempering to reduce the content of residual austenite. This makes it possible to ensure a necessary hardness.

Moreover, by optimizing the contents of alloying elements so as to satisfy expression (2), an additive manufactured article having a thermal conductivity (about 20 W/(m·K) or more) higher than those of conventional maraging steels while retaining the reduced deformation and high hardness of the additive manufactured article can be obtained.

In addition, in cases where the additive manufactured article is tempered after the additive manufacturing, NiAl and alloy carbides precipitate in the steel to reduce the content of alloying elements dissolved in the matrix, thereby heightening the thermal conductivity. As a result, the tempered shaped article has a thermal conductivity higher by about 0.1 W/(K·m)-8 W/(K·m) than that of the as-shaped-state article.

EXAMPLES

Examples 1 to 23 and Comparative Examples 1 to 7

1. Production of Samples
1.1. Production of Metal Powders

Using a gas atomization method, powders of 30 steels shown in Table 1 were produced. There were cases where elements not shown in Table 1 were contained as impurities in amounts within the specified ranges in the powders of the steels shown in Table 1. Comparative Example 1 corresponds to a hot work tool steel (JIS SKD61), Comparative Example 2 corresponds to a martensitic stainless steel (JIS SUS420J2), and Comparative Example 3 corresponds to an 18Ni maraging steel.

2.1.3. Evaluation of Spreadability

Figure 3:
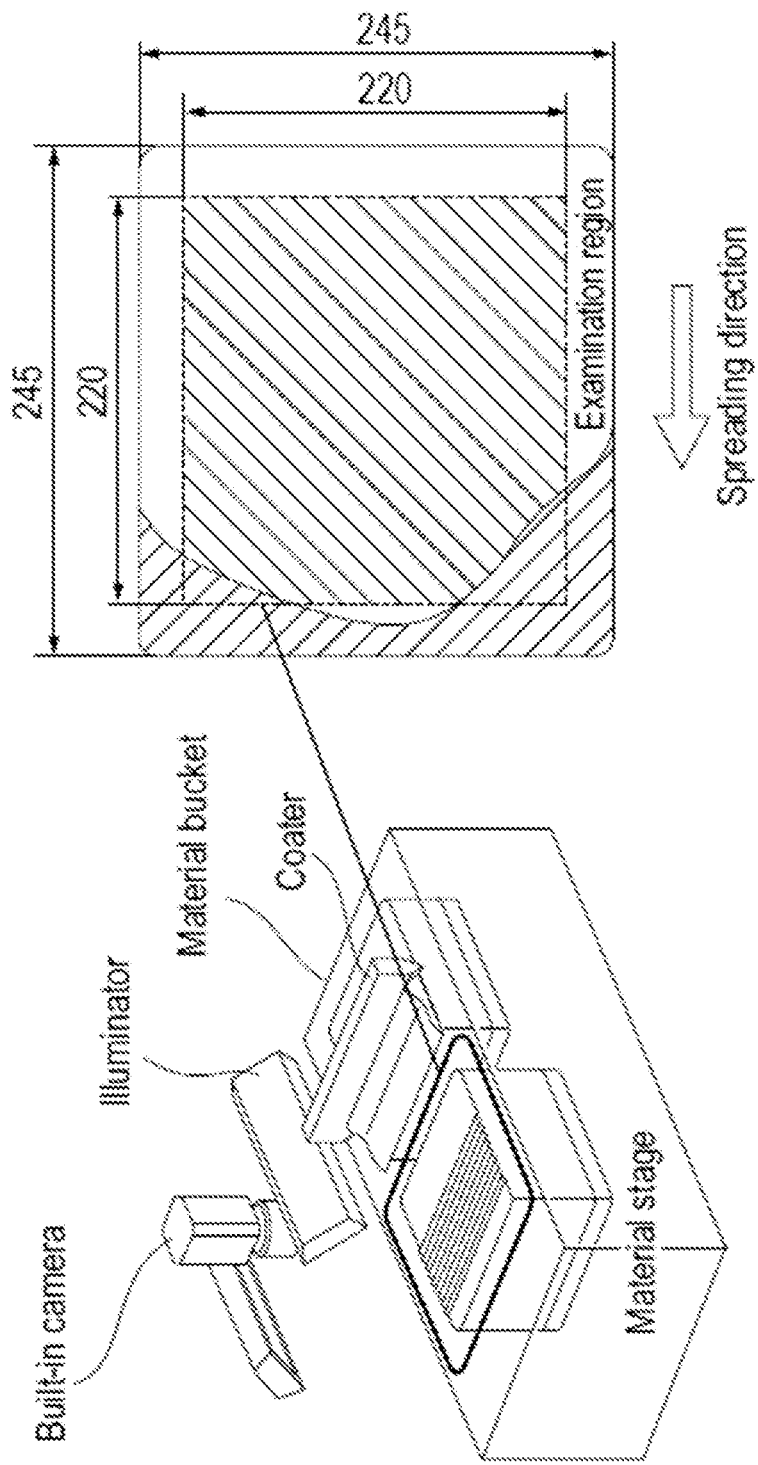
FIG. 3 is schematic views illustrating a method for evaluating spreadability.

FIG. 3 shows schematic views illustrating a method for evaluating spreadability. Each powder was evaluated for spreadability using the 3D metal printer M2, manufactured by Concept Laser GmbH. The coater speed for spreading was regulated to 100 mm/s. The thickness of each powder layer was 50 μm, and the metal powder was fed in an amount corresponding to two times the layer thickness.

The spreading area (245 mm×245 mm) was imaged with a built-in camera. A 220 mm×220 mm region within each captured image was taken as an examination region, and the examination region was examined by binarization by image processing, on the basis of a difference in luminance between a region covered with the spread powder (region A) and a region with no spread powder in the examination region. Furthermore, the percentage of effective area was calculated using the following expression (4).

TABLE 1

| | Components (mass %) | | | | | | | | | | |
|---|---|---|---|---|---|---|---|---|---|---|---|
| | C | Si | Mn | Cr | Ni | Mo | V | N | Al | Variable A | Variable T |
| Example 1 | 0.30 | 0.06 | 1.05 | 5.58 | 4.30 | 1.25 | 0.65 | 0.024 | 0.011 | 12.6 | 5.6 |
| Example 2 | 0.27 | 0.19 | 0.58 | 5.45 | 6.09 | 2.06 | 0.94 | 0.017 | 0.018 | 13.4 | 5.3 |
| Example 3 | 0.35 | 0.41 | 0.82 | 5.72 | 8.23 | 0.84 | 1.34 | 0.028 | 0.024 | 17.2 | 6.0 |
| Example 4 | 0.25 | 0.09 | 1.29 | 5.11 | 3.60 | 1.55 | 0.45 | 0.021 | 0.015 | 11.2 | 5.4 |
| Example 5 | 0.38 | 0.31 | 1.49 | 4.84 | 6.38 | 1.63 | 1.46 | 0.027 | 0.508 | 16.0 | 5.8 |
| Example 6 | 0.19 | 0.13 | 0.98 | 2.31 | 7.65 | 0.60 | 0.34 | 0.015 | 1.506 | 12.6 | 3.0 |
| Example 7 | 0.31 | 0.50 | 0.46 | 5.48 | 3.15 | 2.96 | 1.05 | 0.02 | 0.015 | 11.0 | 5.6 |
| Example 8 | 0.25 | 0.12 | 0.38 | 13.4 | 4.18 | 0.45 | 0.29 | 0.019 | 0.027 | 15.0 | 11.0 |
| Example 9 | 0.29 | 1.01 | 1.09 | 10.31 | 5.31 | 0.23 | 0.87 | 0.027 | 0.036 | 15.9 | 10.1 |
| Example 10 | 0.18 | 0.01 | 0.31 | 14.78 | 2.37 | 1.55 | 0.53 | 0.015 | 0.047 | 12.8 | 11.7 |
| Example 11 | 0.22 | 0.23 | 0.84 | 12.67 | 6.12 | 1.45 | 0.26 | 0.044 | 0.024 | 16.6 | 10.8 |
| Example 12 | 0.33 | 0.60 | 0.57 | 11.72 | 5.16 | 0.68 | 0.55 | 0.018 | 2.11 | 16.5 | 10.5 |
| Example 13 | 0.33 | 1.46 | 0.4 | 2.81 | 5.76 | 2.45 | 1.46 | 0.024 | 0.026 | 12.5 | 4.5 |
| Example 14 | 0.15 | 0.02 | 7.88 | 6.16 | 3.98 | 0.31 | 0.17 | 0.023 | 0.706 | 17.2 | 10.8 |
| Example 15 | 0.23 | 0.79 | 0.96 | 8.36 | 9.95 | 0.36 | 0.17 | 0.035 | 3.209 | 18.5 | 8.2 |
| Example 16 | 0.38 | 1.11 | 0.4 | 9.55 | 2.37 | 2.83 | 1.93 | 0.084 | 0.017 | 13.2 | 9.3 |
| Example 17 | 0.36 | 1.19 | 2.19 | 4.22 | 6.53 | 0.10 | 0.57 | 0.017 | 2.007 | 16.2 | 6.7 |
| Example 18 | 0.18 | 0.02 | 0.39 | 14.57 | 3.29 | 0.20 | 0.81 | 0.173 | 0.05 | 13.7 | 11.6 |
| Example 19 | 0.14 | 0.90 | 1.8 | 2.35 | 5.61 | 2.54 | 0.11 | 0.011 | 0.109 | 10.7 | 4.3 |
| Example 20 | 0.28 | 0.01 | 4.58 | 4.26 | 8.56 | 0.25 | 0.45 | 0.033 | 3.965 | 19.5 | 7.2 |
| Example 21 | 0.11 | 0.08 | 6.47 | 2.19 | 2.08 | 2.31 | 1.58 | 0.098 | 0.056 | 11.3 | 6.8 |
| Example 22 | 0.39 | 0.75 | 0.88 | 7.73 | 9.29 | 0.96 | 1.77 | 0.121 | 3.507 | 19.9 | 8.0 |
| Example 23 | 0.22 | 1.29 | 3.07 | 7.29 | 7.11 | 2.24 | 0.16 | 0.052 | 2.805 | 17.1 | 9.5 |
| Comparative Example 1 | 0.37 | 0.98 | 0.44 | 5.22 | 0.09 | 1.15 | 0.96 | 0.017 | 0.014 | 8.7 | 6.0 |
| Comparative Example 2 | 0.36 | 0.99 | 0.39 | 13.32 | 0.16 | 0.11 | 0.22 | 0.015 | 0.023 | 12.6 | 12.0 |
| Comparative Example 3 | 0.01 | 0.10 | 0.30 | 0.10 | 18.04 | 5.32 | 0.10 | 0.011 | 0.120 | 18.5 | 0.4 |
| Comparative Example 4 | 0.12 | 0.25 | 0.90 | 12.18 | 4.02 | 0.05 | 0.03 | 0.015 | 0.010 | 12.8 | 10.3 |
| Comparative Example 5 | 0.11 | 0.40 | 2.10 | 3.20 | 2.00 | 1.80 | 0.24 | 0.010 | 0.030 | 7.4 | 4.6 |
| Comparative Example 6 | 0.40 | 0.09 | 4.23 | 9.23 | 5.56 | 1.09 | 0.46 | 0.042 | 0.010 | 20.4 | 11.0 |
| Comparative Example 7 | 0.35 | 0.11 | 0.21 | 2.30 | 2.30 | 2.40 | 0.80 | 0.030 | 0.030 | 9.0 | 2.7 |

1.2. Production of Additive Manufactured Articles

Using 3D metal printer M2, manufactured by Concept Laser GmbH, additive manufactured articles (15×15×15 mm cubes) were produced as shaped articles to be examined for Ms point, thermal conductivity, and hardness. The conditions for the additive manufacturing were the same as those for the test for evaluating shapability which will be described later.

2. Test Methods
2.1. Evaluation of Metal Powders
2.1.1. Number Frequency $D_{50}$ The number frequency $D_{50}$ of each powder was determined using particle image analyzer Morphologi G3, manufactured by Malvern Panalytical Ltd.

2.1.2. Avalanche Angle

Avalanche angle was determined using a revolution powder analyzer manufactured by Mercury Scientific Inc. Avalanche angle measurements were made 128 times in total, and an average thereof was determined.

$$\text{Percentage of effective area (\%)} = [\text{area of region } A] \times 100 / [\text{area of examination region}] \quad (4)$$

2.2. Evaluation of Additive Manufactured Articles
2.2.1. Ms Point

Test pieces (4 mm (diameter)×10 mm) for transformation point measurement were cut out of each additive manufactured article in the as-shaped state. The test pieces were heated to 1,000° C.-1,300° C. and then cooled to 20° C. at a cooling rate of 100° C./min to examine the test pieces for temperature change and dimensional change during the cooling.

Figure 4:
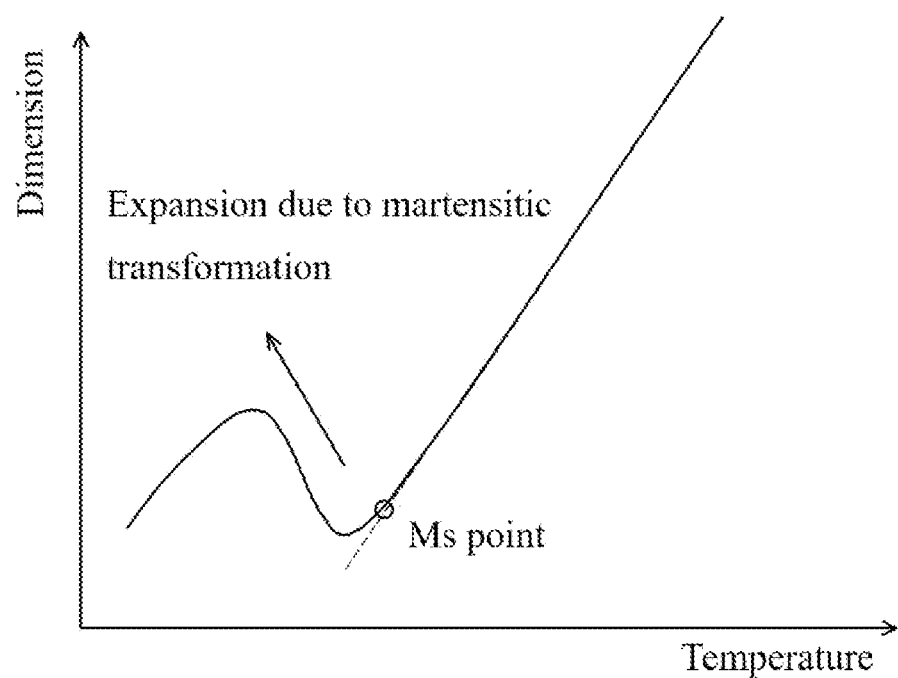
FIG. 4 is a diagram showing an example of relationships between temperature and dimensional change obtained when a sample for transformation point measurement was cooled at a given cooling rate.

FIG. 4 shows a diagram illustrating an example of relationships between temperature and dimensional change obtained when the samples for transformation point measurement were cooled at the given cooling rate. As FIG. 4 shows, the temperature at which the dimensional change shifted from thermal contraction to thermal expansion was taken as a martensitic-transformation start temperature (Ms).

2.2.2. Thermal Conductivity

Test pieces (10 mm (diameter)×2 mm) for thermal conductivity measurement were cut out of each additive manufactured article in the as-shaped state. Using a laser flash method, the test pieces were examined at 25° C. for specific heat and thermal diffusivity. In preparation for the measurement, both surfaces of the test piece were coated by carbon spraying. The test pieces were examined for density by the Archimedes method (JIS Z8807:2012). Furthermore, the thermal conductivity was calculated using the following expression (5).

$$\text{Thermal conductivity} = [\text{thermal diffusivity}] \times [\text{specific heat}] \times [\text{density}] \quad (5)$$

2.2.3. As-Shaped-State Hardness

Test pieces for hardness measurement were cut out from around the center of each additive manufactured article in the as-shaped state. The test pieces obtained were examined for Rockwell hardness (JIS Z2245:2016).

2.2.4. Shapability

Using 3D metal printer M2, manufactured by Concept Laser GmbH, an additive manufactured article having dimensions of 18 mm (width)×30 mm (length)×10 mm (height) was produced on a strip-form base plate having dimensions of 20 mm (width)×150 mm (length)×15 mm (height). The energy density was 85 J/mm³. The additive manufacturing was conducted while preheating the additive manufactured article with the heater at a temperature of Ms-30° C. to Ms-80° C. The atmosphere for the shaping was a nitrogen atmosphere.

Figure 5A:
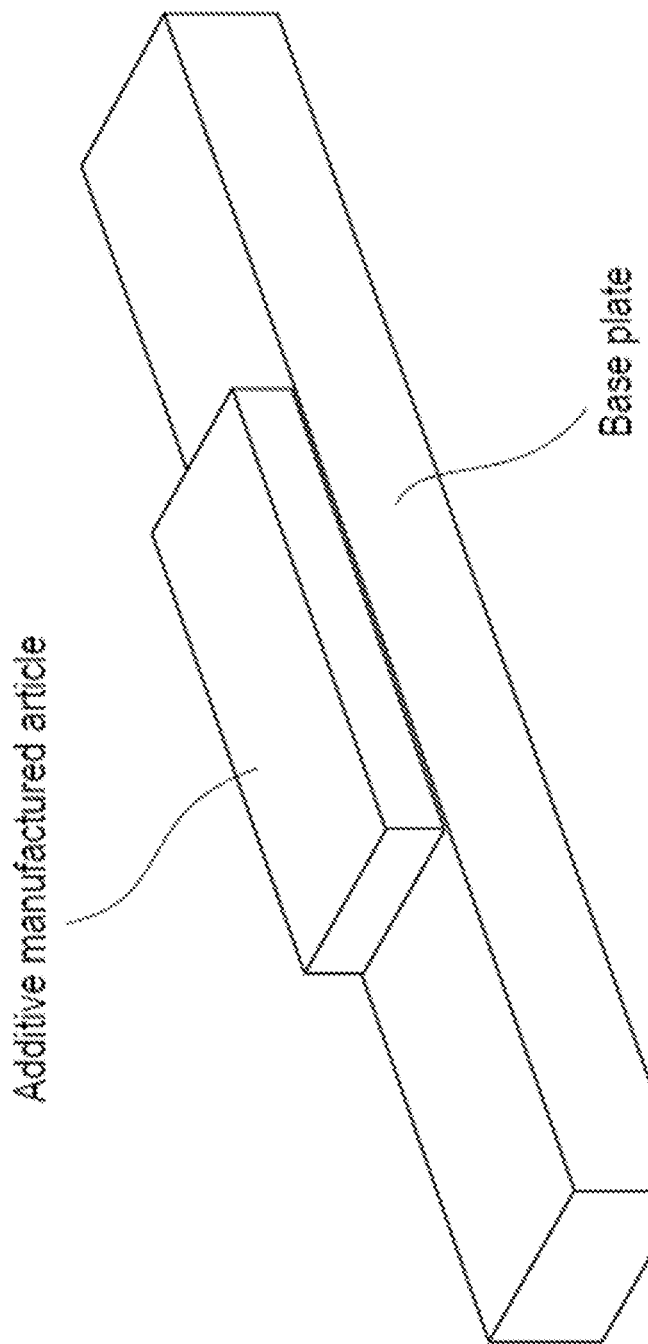
FIG. 5A and FIG. 5B are schematic views illustrating a method for measuring warpage amount.
Figure 5B:
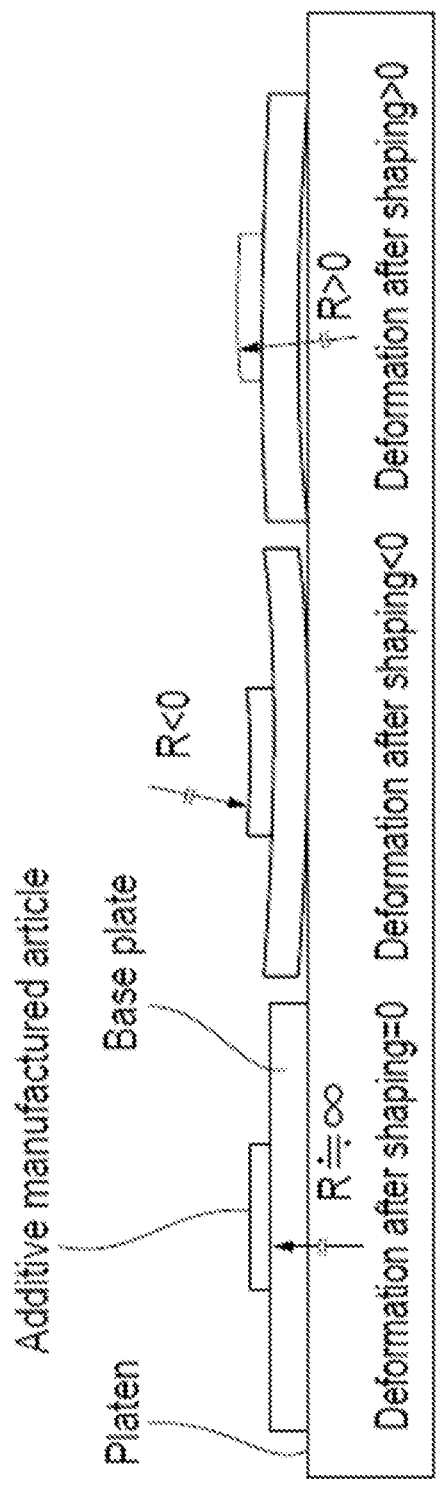

FIG. 5A and FIG. 5B show schematic views illustrating a method for measuring warpage amount. After completion of the additive manufacturing, the base plate was taken out and placed on a platen. The appearance of the base plate and shaped article was imaged from a horizontal direction so that the whole shaped article was captured, and this photograph was subjected to image analysis to calculate the radius of curvature R and thickness t of the additive manufactured article. The deformation after shaping was calculated using the following expression (6).

$$\text{Deformation after shaping (\%)} = t \times 100/(2R+t) \quad (6)$$

The radius of curvature R can be calculated also by placing the base plate on a platen, measuring the distance from the platen with a laser displacement meter or a stylus type dimension gauge at regular intervals along the longitudinal direction of the shaped article, and approximating the measured displacement values to values included in a circle.

The shaped article which had been examined for warpage amount was cut into five equal parts along planes perpendicular to the layer stacking direction. Sections of the five samples were polished and then examined for cracks with an optical microscope.

3. Results

The results are shown in Table 2. In Table 2, with respect to spreadability, "A" indicates that the percentage of effective area was 98% or higher and "B" indicates that the percentage of effective area was less than 98%.

With respect to cracking, "A" indicates that no cracks were observed, "B" indicates that one or more cracks were observed only in one of the five sections, and "C" indicates that one or more cracks were observed in two or more of the five sections.

Figure 6:
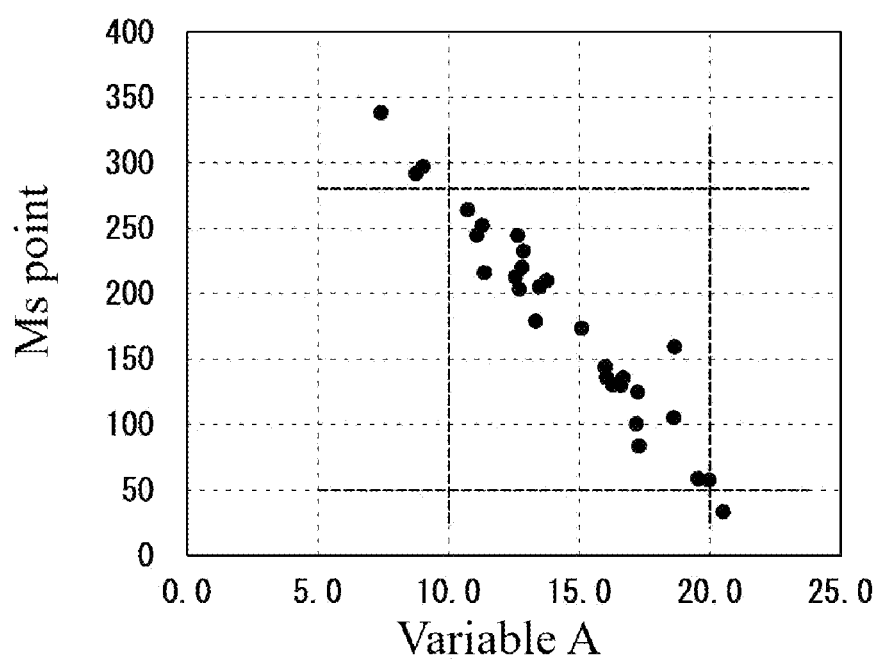
FIG. 6 is a diagram showing a relationship between variable A and Ms point.
Figure 7:
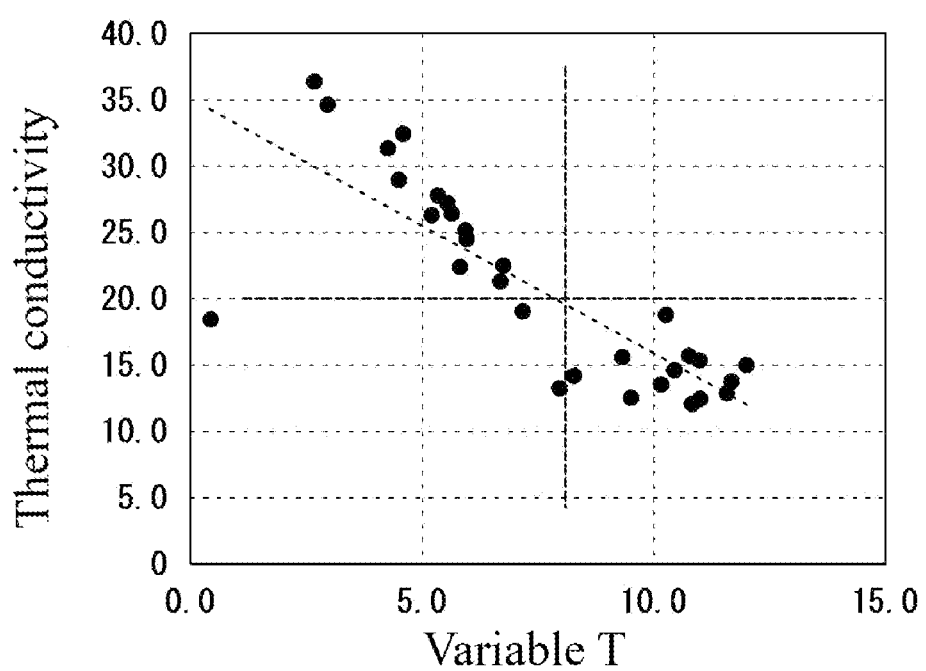
FIG. 7 is a diagram showing a relationship between variable T and thermal conductivity.
Figure 8:
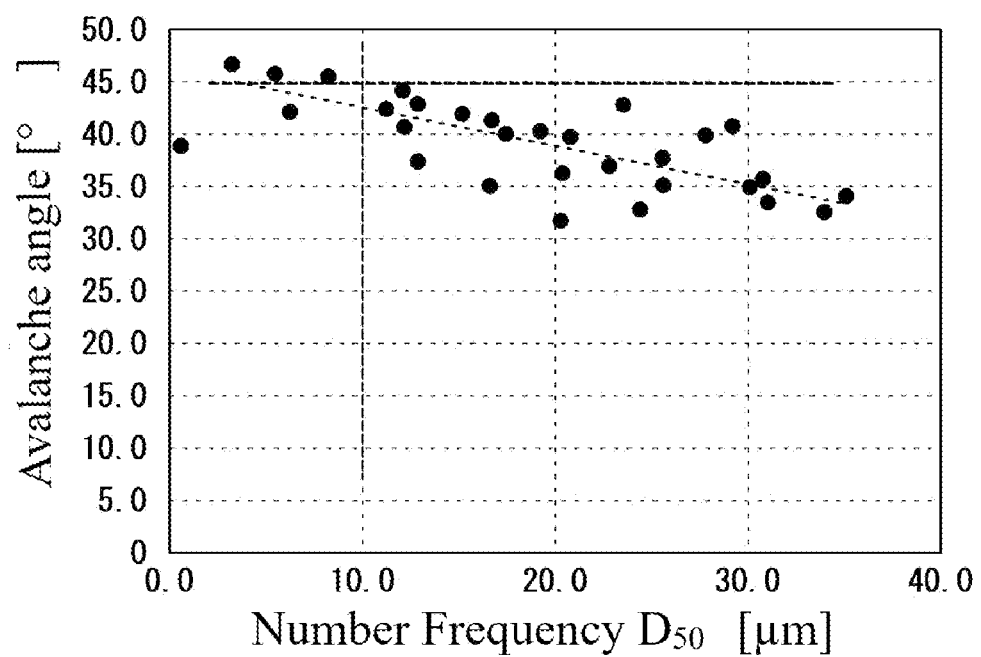
FIG. 8 is a diagram showing a relationship between $D_{50}$ and avalanche angle.
Figure 9:
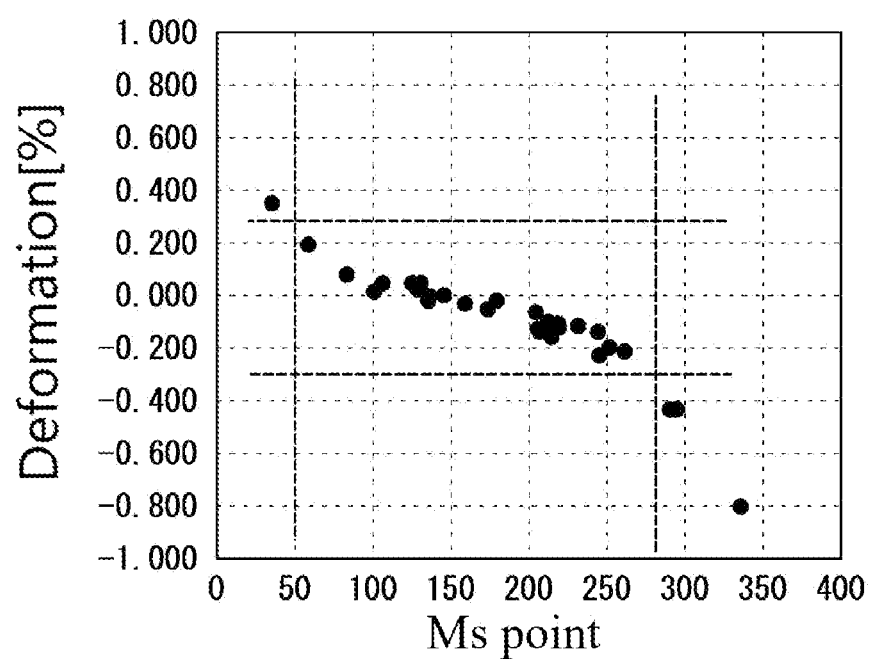
FIG. 9 is a diagram showing a relationship between Ms point and after-shaping deformation.

FIG. 6 shows a relationship between variable A and Ms point. FIG. 7 shows a relationship between variable T and thermal conductivity. FIG. 8 shows a relationship between $D_{50}$ and avalanche angle. FIG. 9 shows a relationship between Ms point and after-shaping deformation. The following can be seen from Table 2 and FIG. 6 to FIG. 9.

(1) In Comparative Example 1, the additive manufactured article had an Ms point exceeding 280° C. and an absolute value of after-shaping deformation exceeding 0.3%, and cracks were observed therein. This is thought to be because the metal powder had had too low an Ni content. (2) In Comparative Example 2, the additive manufactured article had too low a thermal conductivity. This is thought to be because the metal powder had too high a Cr content and hence had a value of variable T exceeding 8. Furthermore, cracks were slightly observed in the additive manufactured article. This is thought to be because the additive manufactured article had too high an as-shaped-state hardness due to too high a C content and hence had insufficient toughness during the shaping. Moreover, the metal powder of Comparative Example 2 had a $D_{50}$ less than 10 μm and hence showed poor spreadability. This is thought to be because the particles agglomerated due to the high stickiness to have an increased avalanche angle and impaired flowability.

(3) In Comparative Example 3, the additive manufactured article had too low a thermal conductivity. This is thought to be because the metal powder had too high an Ni content. Furthermore, the metal powder of Comparative Example 3 had a $D_{50}$ less than 10 μm and hence showed poor spreadability. This is thought to be because of the same reason as in Comparative Example 2. (4) In Comparative Example 4, the additive manufactured article had too low a thermal conductivity. This is thought to be because the metal powder had too high a Cr content and hence had a value of variable T exceeding 8. Furthermore, the metal powder of Comparative Example 4 had a $D_{50}$ less than 10 μm and a large avalanche angle and hence had poor spreadability. This is thought to be because the particles agglomerated due to the high stickiness to have an increased avalanche angle and impaired flowability.

(5) In Comparative Example 5, the additive manufactured article had an Ms point exceeding 280° C. and an absolute value of after-shaping deformation exceeding 0.3%. This is thought to be because the metal powder had a value of variable A less than 10. Furthermore, the metal powder of Comparative Example 5 had a large avalanche angle and too small a value of $D_{50}$ and hence had poor spreadability. This is thought to be because the particles agglomerated due to the high stickiness to have an increased avalanche angle and impaired flowability. (6) In Comparative Example 6, the additive manufactured article had an Ms point lower than 50° C. This is thought to be because the metal powder had a value of variable A exceeding 20. Furthermore, the additive manufactured article of Comparative Example 6 had too low a thermal conductivity. This is thought to be because the metal powder had too high contents of Mn and Cr, which lower the thermal conductivity. The additive manufactured article of Comparative Example 6 had an absolute value of after-shaping deformation exceeding 0.3%. This is thought to be because the Ms point was around room temperature and martensitic transformation had hence not proceeded during the shaping, producing no deformation-inhibiting effect, and because an upper portion of the shaped article underwent martensitic transformation when cooled after the shaping and, hence, the shaped article deformed considerably so as to protrude upward.

(7) In Comparative Example 7, the additive manufactured article had an Ms point exceeding 280° C. This is thought to be because the metal powder had too high an Mn content and a value of variable A less than 10. Furthermore, the additive manufactured article had an absolute value of after-shaping deformation exceeding 0.3% and had cracks. This is thought to be because the metal powder had a relatively high C content to give martensite having low toughness and because the Ms point was 280° C. or higher and martensitic transformation had proceeded during the shaping, yielding a shaped article having insufficient toughness. (8) In Examples 1 to 23, the additive manufactured articles each had an absolute value of after-shaping deformation of 0.3% or less and had substantially no cracks. This is thought to be because the composition had been optimized so as to result in a variable A within the given range and because this optimization had resulted in an Ms point within the proper range. (9) In the case where compositions were regulated so as to result in variables T within the given range, each metal powder brought about a thermal conductivity of 20 W/(m·K) or higher.

TABLE 2

|  | Avalanche angle (°) | $D_{50}$ (μm) | Ms (° C.) | Thermal conductivity (W/(m · K)) | Spreadability | Percentage of effective area (%) | After-shaping deformation (%) | As-shaped-state hardness (HRC) | Cracking |
|---|---|---|---|---|---|---|---|---|---|
| Example 1 | 37.4 | 12.8 | 222 | 26.3 | A | 99.63 | −0.122 | 53 | A |
| Example 2 | 35.0 | 30.1 | 208 | 26.2 | A | 99.78 | −0.115 | 51 | A |
| Example 3 | 34.9 | 16.6 | 127 | 24.4 | A | 99.81 | 0.044 | 58 | A |
| Example 4 | 31.7 | 20.3 | 253 | 27.8 | A | 99.90 | −0.199 | 52 | A |
| Example 5 | 40.0 | 17.4 | 138 | 22.4 | A | 99.25 | −0.028 | 59 | A |
| Example 6 | 41.9 | 15.1 | 245 | 34.6 | A | 98.71 | −0.134 | 42 | A |
| Example 7 | 41.3 | 16.7 | 245 | 27.1 | A | 98.96 | −0.226 | 57 | A |
| Example 8 | 40.3 | 19.2 | 176 | 15.2 | A | 99.19 | −0.051 | 52 | A |
| Example 9 | 39.6 | 20.8 | 146 | 13.6 | A | 99.31 | −0.002 | 53 | A |
| Example 10 | 42.8 | 12.9 | 221 | 13.8 | A | 98.72 | −0.107 | 42 | A |
| Example 11 | 37.7 | 25.6 | 137 | 15.8 | A | 99.57 | −0.004 | 46 | A |
| Example 12 | 35.6 | 30.8 | 132 | 14.7 | A | 99.74 | 0.009 | 60 | B |
| Example 13 | 33.5 | 31.1 | 214 | 28.9 | A | 99.85 | −0.100 | 60 | B |
| Example 14 | 37.0 | 22.7 | 85 | 12.1 | A | 99.64 | 0.075 | 38 | A |
| Example 15 | 36.3 | 20.4 | 107 | 14.2 | A | 99.70 | 0.036 | 49 | A |
| Example 16 | 32.7 | 24.5 | 181 | 15.6 | A | 99.87 | −0.015 | 60 | B |
| Example 17 | 35.0 | 30.1 | 132 | 21.2 | A | 99.78 | 0.044 | 57 | A |
| Example 18 | 42.8 | 23.6 | 211 | 12.8 | A | 98.60 | −0.134 | 45 | A |
| Example 19 | 44.1 | 12.1 | 264 | 31.3 | A | 98.01 | −0.212 | 37 | A |
| Example 20 | 32.6 | 34.1 | 61 | 20.0 | A | 99.88 | 0.192 | 53 | A |
| Example 21 | 39.9 | 27.8 | 217 | 22.6 | A | 99.53 | −0.152 | 35 | A |
| Example 22 | 40.8 | 29.3 | 59 | 13.3 | A | 98.96 | 0.192 | 52 | A |
| Example 23 | 35.1 | 25.6 | 102 | 12.6 | A | 99.77 | 0.008 | 48 | A |
| Comparative Example 1 | 33.9 | 35.2 | 292 | 25.1 | A | 99.83 | −0.433 | 59 | C |
| Comparative Example 2 | 45.5 | 8.2 | 205 | 14.9 | B | 94.11 | −0.066 | 60 | B |
| Comparative Example 3 | 42.1 | 6.1 | 162 | 18.4 | B | 94.47 | −0.036 | 24 | A |
| Comparative Example 4 | 45.8 | 5.4 | 234 | 18.9 | B | 90.69 | −0.118 | 35 | A |
| Comparative Example 5 | 46.7 | 3.2 | 338 | 32.3 | B | 93.93 | −0.809 | 36 | A |
| Comparative Example 6 | 42.5 | 11.3 | 36 | 12.4 | A | 98.61 | 0.345 | 59 | A |
| Comparative Example 7 | 40.4 | 12.2 | 298 | 36.2 | A | 99.17 | −0.432 | 61 | C |

The present invention has been described in detail with reference to specific embodiments thereof. However, the invention is not limited to the embodiments and can be variously modified without departing from the spirit thereof.

The present application is based on Japanese Patent Application No. 2020-086650 filed on May 18, 2020, and the contents thereof are incorporated herein by reference.

The metal powder according to the present invention can be used as a powdery raw material for producing molds required to be cooled (e.g., die-casting molds, hot-stamping dies, and dies for tailored die quenching) by additive manufacturing.

The invention claimed is:

1. A metal powder consisting of:
0.1≤C≤0.4 mass %,
0.005≤Si≤1.5 mass %,
0.3≤Mn≤8.0 mass %,
2.0≤Cr≤15.0 mass %,
2.0≤Ni≤10.0 mass %,
0.1≤Mo≤3.0 mass %,
0.1≤V≤2.0 mass %,
0.010≤N≤0.200 mass %, and
0.01≤Al≤4.0 mass %,
with the balance being Fe and unavoidable impurities, and satisfying the following expression (1) such that the metal powder has a martensitic-transformation start temperature (Ms point) within a range of 50° C. to 280° C.:

$$10<15[C]+[Mn]+0.5[Cr]+[Ni]<20 \qquad (1),$$

in which [C], [Mn], [Cr] and [Ni] respectively represent the contents of C, Mn, Cr and Ni by mass %.

2. The metal powder according to claim 1, which further satisfies the following expression (2):

$$2[C]\pm[Si]+0.75[Mn]+0.75[Cr]<8 \qquad (2)$$

in which [C], [Si], [Mn] and [Cr] respectively represent the contents of C, Si, Mn, and Cr by mass %.

3. The metal powder according to claim 1, which has a number frequency $D_{50}$ of 10 μm or more and an avalanche angle of 45° or less.

4. The metal powder according to claim 2, which has a number frequency $D_{50}$ of 10 μm or more and an avalanche angle of 45° or less.

5. The metal powder according to claim 1, wherein, in terms of mass %, a content of the Si is 0.05≤Si≤0.09.

6. The metal powder according to claim 1, wherein, in terms of mass %, a content of the C is 0.20≤C≤0.30 mass %.

7. The metal powder according to claim 1, wherein, in terms of mass %, a content of the Mn is 0.35≤Mn≤2.0 mass %.

8. The metal powder according to claim 1, wherein, in terms of mass %, a content of the Mn is 0.35≤Mn≤1.0 mass %.

9. The metal powder according to claim 1, wherein, in terms of mass %, a content of the Cr is 2.9≤Cr≤14 mass %.

10. The metal powder according to claim 1, wherein, in terms of mass %, a content of the Cr is 2.9≤Cr≤13 mass %.

11. The metal powder according to claim 1, wherein, in terms of mass %, a content of the Ni is 3.2≤Ni≤8.5 mass %.

12. The metal powder according to claim 1, wherein, in terms of mass %, a content of the Ni is 4.0≤Ni≤6.5 mass %.

13. The metal powder according to claim 1, wherein, in terms of mass %, a content of the Mo is 0.2≤Mo≤2.9 mass %.

14. The metal powder according to claim 1, wherein, in terms of mass %, a content of the Mo is 0.5≤Mo≤1.8 mass %.

15. The metal powder according to claim 1, wherein, in terms of mass %, a content of the V is 0.2≤V≤1.5 mass %.

16. The metal powder according to claim 1, wherein, in terms of mass %, a content of the N is 0.011≤N≤0.100 mass %.

17. The metal powder according to claim 1, wherein, in terms of mass %, a content of the N is 0.012≤N≤0.050 mass %.

18. The metal powder according to claim 1, wherein, in terms of mass %, a content of the Al is 0.01≤Al≤2.5 mass %.

19. The metal powder according to claim 1, wherein, in terms of mass %, a content of the Al is 0.01≤Al≤1.5 mass %.

\* \* \* \* \*